US012792869B2

(12) United States Patent
Cakir et al.

(10) Patent No.: US 12,792,869 B2
(45) Date of Patent: Nov. 10, 2026

(54) SYSTEM AND METHOD FOR POST-TRAINING QUANTIZATION OF DEEP NEURAL NETWORKS WITH PER-CHANNEL QUANTIZATION MODE SELECTION

(71) Applicant: Samsung Electronics Co., Ltd., Gyeonggi-do (KR)

(72) Inventors: Fatih Cakir, San Diego, CA (US); Mostafa El-Khamy, San Diego, CA (US); Jungwon Lee, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 1565 days.

(21) Appl. No.: 17/173,107

(22) Filed: Feb. 10, 2021

(65) Prior Publication Data

US 2022/0092383 A1 Mar. 24, 2022

Related U.S. Application Data

(60) Provisional application No. 63/080,168, filed on Sep. 18, 2020.

(51) Int. Cl.
*G06N 3/04* (2023.01)

(52) U.S. Cl.
CPC .................................... *G06N 3/04* (2013.01)

(58) Field of Classification Search
CPC .................................................... G06N 3/04
See application file for complete search history.

(56) References Cited

U.S. PATENT DOCUMENTS

2019/0156215 A1 5/2019 Matveev et al.
2019/0340492 A1 11/2019 Burger et al.
2020/0280717 A1* 9/2020 Li .......................... G06N 3/08
2021/0150373 A1* 5/2021 Crouse ................. G06N 5/013

FOREIGN PATENT DOCUMENTS

CN 110322008 A * 10/2019
WO WO2020131968 6/2020
WO WO2020160787 8/2020

OTHER PUBLICATIONS

Krishnan et al., Quantized Reinforcement Learning (QuaRL)., Oct. 2019, 10.13140/RG.2.2.25074.66240. (Year: 2019).*
Nagel et al., Data-Free Quantization Through Weight Equalization and Bias Correction, Nov. 25, 2019, Qualcomm AI Research Qualcomm Technologies Netherlands B.V., arXiv:1906.04721 (Year: 2019).*
Alizedeh et al., Gradient L1 Regularization for Quantization Robustness, Feb. 18, 2020, ICLR 2020, Qualcomm AI Research Qualcomm Technologies Netherlands B.V., arXiv:2002.07520 (Year: 2020).*
(Continued)

*Primary Examiner* — Viker A Lamardo
*Assistant Examiner* — Sally T. Ley
(74) *Attorney, Agent, or Firm* — The Farrell Law Firm, P.C.

(57) ABSTRACT

A method and system are provided. The method includes topologically sorting layers of a neural network, selecting a quantization process that utilizes a quantization of a previous layer, and determining, with the selected quantization process, a quantization mode of one layer in the neural network based on the quantization of a previous layer.

20 Claims, 4 Drawing Sheets

(56) References Cited

OTHER PUBLICATIONS

Choi, et. al. (arXiv: 1809.00095v1 [cs.CV] Sep. 1, 2018) (Year: 2018).*
Alizadeh et al. (arXiv:2002.07520v1 [cs.LG] Feb. 18, 2020), (Year: 2020).*
Krishnan et al. (arXiv:1910.01055v3 [cs.LG] Dec. 7, 2019) (Year: 2019).*
JH Lee et al. Quantization for Rapid Deployment of Deep Neural Networks, Arxiv 2018. https://arxiv.org/abs/1810.05488 https://openreview.net/forum?id=HkzZBi0cFQ, pp. 9.

* cited by examiner

400

SYSTEM AND METHOD FOR POST-TRAINING QUANTIZATION OF DEEP NEURAL NETWORKS WITH PER-CHANNEL QUANTIZATION MODE SELECTION

PRIORITY

This application is based on and claims priority under 35 U.S.C. § 119(e) to U.S. Provisional Patent Application Ser. No. 63/080,168, filed on Sep. 18, 2020, the entire contents of which is incorporated herein by reference.

FIELD

The present disclosure is generally related to machine learning model quantization.

BACKGROUND

Machine learning model quantization is the task of obtaining a low-memory footprint model that is also suitable for integer arithmetic inference. There is a need for more efficient and effective quantization methods.

SUMMARY

According to one embodiment, a method includes topologically sorting layers of a neural network, selecting a quantization process that utilizes a quantization of a previous layer, and determining, with the selected quantization process, a quantization mode of one layer in the neural network based on the quantization of a previous layer.

According to one embodiment, a system includes a memory and a processor configured to topologically sort layers of a neural network, select a quantization process that utilizes a quantization of a previous layer, and determine, with the selected quantization process, a quantization mode of one layer in the neural network based on the quantization of a previous layer.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
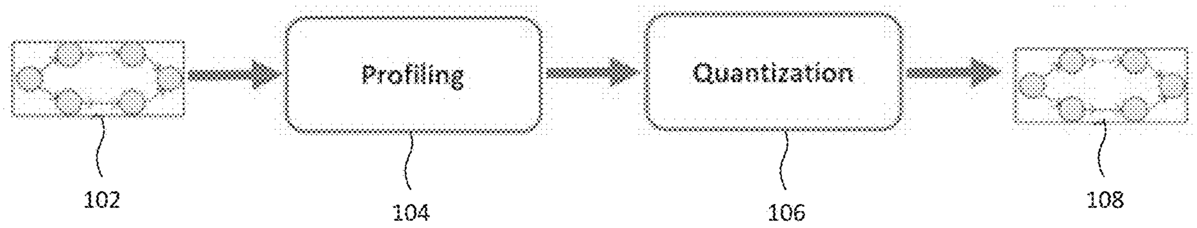
FIG. 1 illustrates a diagram of a quantization method.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc., may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

This disclosure provides a quantization method that is able to achieve the state-of-the-art performance.

The disclosed system and method selects appropriate quantization parameters at a per-layer (per-tensor) or per-axis (per-channel) level during post-training quantization. Specifically, the system and method finds the optimal quantization parameters in an iterative method. This method includes minimizing a quantization loss objective computed over a set of model inputs (calibration data).

Novel quantization methodology that selects the optimal quantization mode (parameters) for each network layer (per-tensor) or for each output channel per layer (per-axis) is provided. Rather than selecting a single quantization mode or the whole network, this method finds the locally optimal quantization mode for each layer or channel, while minimizing the aggregate loss due to quantization. The method provides a finer quantization granularity, selects quantization parameters optimally, and improves the quantized model performance.

FIG. 1 illustrates a diagram of a quantization method. FIG. 1 shows a neural network model 102, and then a two-step process including profiling 104 and quantization 106, which produces the quantized neural network model 108. The method includes a quantization tool for expediting neural network inference for low-precision hardware.

The quantization parameters in the method are first obtained through profiling the neural network. Profiling is the process of acquiring statistics of the activations and parameters of the neural network by feed-forwarding a set of input data. To acquire statistics for activations, a calibration dataset that may be representative of the training and/or the test data should be used. The method uses the calibration data in collecting statistics such as the min, max, mean and standard deviation values of the network parameters and/or layer input/outputs. If such statistics are readily available as meta-data, (e.g., embedded in the model itself as deduced during model training, then such information can be directly used in addition to or without requiring the profiling step).

To collect these statistics, the method assumes that the data follows a specific probability distribution. These different forms reflect the underlying data distributions, and is dubbed as quantization modes in the method. Notable quantization modes are listed as the following:

MAX: The mode sets the quantization parameters of a set based on its maximum element.

OPT: This mode assumes the data distribution of a set follows a Laplace distribution.

OPT_NORMAL: This mode considers a normal distribution.

OPT_LOGISTIC: This mode considers a logistic distribution.

OPT_SECH: This mode considers a hyperbolic secant distribution.

OPT_SCAUCHY: This mode considers a super Cauchy distribution.

The scaling factor for these modes are precomputed for a variety of bit-lengths. After profiling, this scaling factor is multiplied by the estimated standard deviation (of a set to be quantized). This scaling factor is then used in quantization of the relevant set. Hence, each of these modes yields a different quantization parameter.

The method has several issues. The method applies quantization in suboptimal manners. For example, the method may apply quantization for each layer independently without regard to the quantization of other layers. The method has no clear strategy in applying quantization for general machine learning models that are represented as directed acyclic graphs. The method also applies a single set of quantization parameters at a layer or tensor level without further quantization granularity, and does not select quantization parameters based on a quantitative quality measure, such as an objective function. This disclosure provides improvements upon this limitation.

Applying a single mode to all layer activations may be suboptimal. Not all layer outputs follow a particular distribution. Therefore, it is beneficial to select modes for each layer individually. If there are K modes and L layer outputs, this amounts to $L^K$ possibilities, rendering the enumeration of all these possibilities computationally infeasible.

Instead, one can opt to an iterative selection scheme, in which starting from the first layer, a mode can be selected sequentially. The modes "fitness criterion" can be based on the quantization loss or other relevant losses the mode incurs if that mode were selected in the quantization. During this sequential approach, all previous layer outputs can be quantized according to their selected modes, or to make things simpler, they can be fixed to their original floating point values.

If the underlying hardware supports per-channel (axis) quantization parameters, the mode selection approach outlined above can be conducted for each channel per layer. This provides additional flexibility with the assumption that each channel activation follow their own probability distribution. In practice, the choice on whether choosing a single mode for the entire set of network layer outputs, or choosing different modes at a per-layer basis, or at a per-channel basis depends on multiple factors: the size of the network, the set of the calibration set for profiling, etc.

Figure 2A:
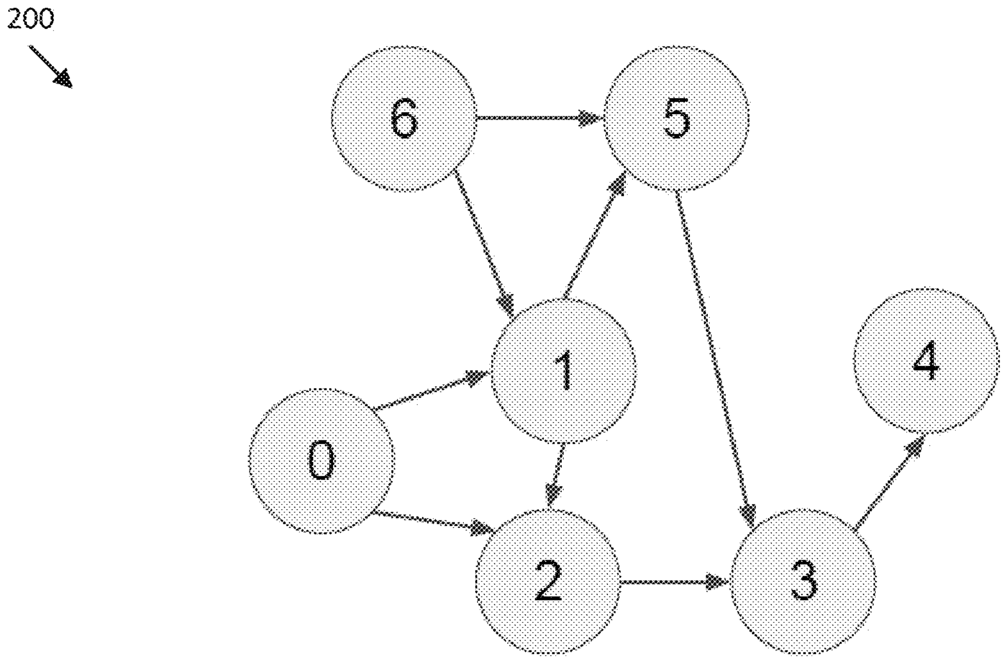
FIGS. 2A and 2B illustrate diagrams of machine learning models, according to one embodiment.
Figure 2B:
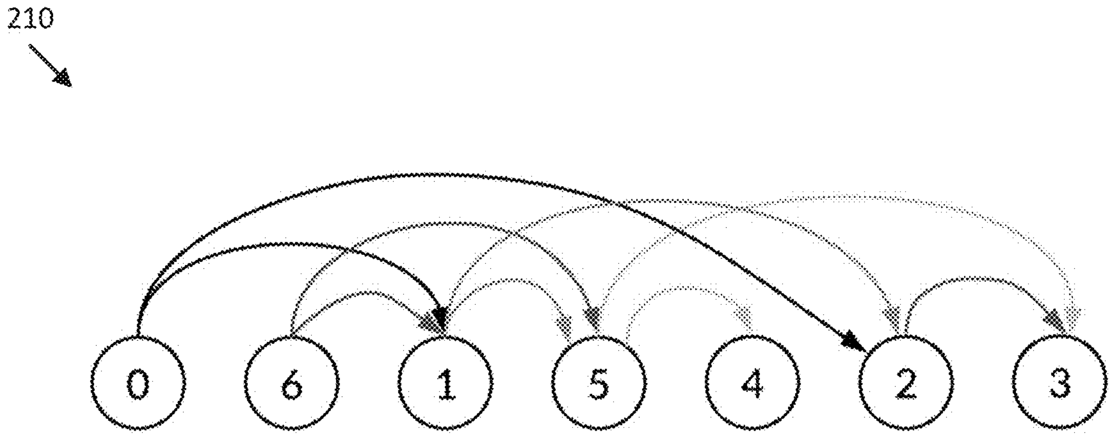

FIGS. 2A and 2B illustrate diagrams of machine learning models, according to one embodiment. FIG. 2A shows an example, basic machine learning model 200. FIG. 2B shows a machine learning model 210 with layers in topological order. Each layer (i.e., neuron 0 through neuron 6) represents a computational block in the respective machine learning model and, in general, corresponds to a layer (or tensor or layer and/or its activations). Model layers may correspond to layer kernels (or channels or axes in layer activations). In the model 210, since the layers are topologically sorted, when determining the quantization mode of, for example, neuron 5, the quantization of past layers (e.g., neuron 0, neuron 6 and neuron 1) are taken into account.

Once the layers are sorted in topological order, the system and method applies quantization based on a per-neuron mode selection process or a per-axis mode selection process, as described below.

Formally, assume a neural network model defined as a directed acyclic graph G=(V,E), where the following holds:

V is a finite set of layers, |V|=N;

$E \subseteq V \times V$ is a set of (directed) edges;

$V^{in} \subseteq V$ is a non-empty set of input layers;

$V^{out} \subseteq V$ is a non-empty set of output layers;

Each layer or neuron $v \in V$ is associated with a function $$f_v : \mathbb{R}^{d_v^{in}} \rightarrow \mathbb{R}^{d_v^{out}} \text{ where } d_v^{in}$$

is the number of edges whose target is v. Without loss of generality if it is assumed $f_v$ is a scalar function, i.e., $$d_v^{out} = 1,$$

the vector of real values $$\mathbb{R}^{d_v^{in}}$$

that v takes as input is the outputs of layers v' such that $(v', v) \in E$; and All layers have a path some input layer.

Given the above definition for a neural network and, assuming without loss of generality that $f_v$ is a scalar function, the disclosure provides the pseudo-code algorithm below in Table 1 that specifies how to set a mode for each neuron output. This is equivalent to choosing a quantization mode at a per-neuron basis. For notational convenience, function $f_v(\bullet;\ m_1, \ldots, m_k)$ is enhanced, where $m_{i \in [1,N]} \in \{OPT, MAX, HYB, FP, \ldots\}$ and i indexes layers before and including v in a topological order. It is assumed this enhanced function applies the quantization as defined by the modes to the activations/outputs of every layer prior to and including v. For convenience, it is assumed mode FP refers to a 'no-quantization' mode. The parentheses in the set union U operations are discarded.

TABLE 1

Algorithm: Per-layer mode selection scheme

```
input :   Neural network G = (V, E) where V is in topological
          order (|V| = N), quantization modes modes ≜ {OPT,
          MAX, HYB, FP, ...}, calibration dataset X ≜ {x_i|k = 1,
          ..., M}. Procedure fitness(P, Q) which is a quantitative
          measure on the difference between the two sets P and Q.
output:   Quantization mode for each layer output: {m_i|i = 1, ...,
          N}
for i ∈ [1, N] do
 |    fit← inf
 |    m_i← FP
 |    for m ∈ modes \ FP do
 |     |    f ← fitness(∪_{k∈[1,M]} f_{v_i}(x_k; m_1, ..., m_{i−1}, m),
 |     |    ∪_{k∈[1,M]} f_{v_i}(x_k; m_1, ..., m_{i−1}, FP))
 |     |    if fit > f then
 |     |     |    fit ← f
 |     |     |    m_i ← m
 |     |    end
 |    end
end
```

For the per-layer mode selection process, first, the system topologically sorts the layer set. A quantization mode entails using different set of quantization parameters including but not limited to scaling, bias, number of quantization points, etc. Then for each layer in the sorted layer set, the system selects a mode from the available modes, excluding the floating point mode, and applies the corresponding quantization to the layer output. Using a quantitative metric, the system compares the layer output before and after applying the quantization over a set of calibration inputs. If it is better than the current best (according to the metric), then the system sets the mode as the current best mode. Thus, the process utilizes a quantization of a previous layer. The system the registers the current best mode as the best mode for the current layer (any computation of this layer output will automatically use this mode going forward). The system then outputs the registered set of best modes, one for each layer (output).

If $f_v$ is a vector or tensor valued function $$f_v : \mathbb{R}^{d_v^{in}} \rightarrow \mathbb{R}^{d_v^{out}},$$

then the mode granularity (quantization granularity) of the above scheme can be specified. In one embodiment, a mode, hence quantization parameter, may be selected for the entire output $$\mathbb{R}^{d_v^{out}}$$

for layer v. In another embodiment, a mode may be selected at a finer granularity.

A 'per-output channel' case in which the output of $f_v$ is a tensor and a quantization mode is selected for each axis/dimension of this tensor is also provided. Without loss of generality, assume this tensor is a matrix for layer $v_i$ with output dimension $$d_{v_i}^{out} = K_i^{out} \times L_i^{out},$$

and the selected axis is the second dimension. Function $f_{v_i}(\bullet;\ m_1, \ldots, m_i)$ can be modified, where each mode vector $$m_i \in L_i^{out}$$

associates and applies a quantization mode for each output axis in the output tensor of layer $v_i$, It is assumed assume the set of layers or layers V to be topologically sorted. The algorithm below in Table 2 provides pseudo-code for a per-axis mode selection scheme.

TABLE 2

Algorithm: Per-axis mode selection scheme

```
input: Neural network G = (V, E) where V is in topological order
       (|V| = N), quantization modes modes ≜ {OPT, MAX,
       HYB, FP, . . . }, calibration dataset 𝒳 ≜ {x_i|k = 1,
       . . . , M}. Procedure fitness (P, Q) which is a quantitative
       measure on the difference between the two sets P and Q.
```

TABLE 2-continued

Algorithm: Per-axis mode selection scheme

```
output: Quantization mode for each layer output: {m_i ∈ ℝ^(L_i^out) | i = 1, . . . , N}
for i ∈ [1, N] do
|   m_i[j] ← FP ∀ j ∈ [1, L_i^out]
|   for j ∈ [1, L_i^out] do
|   |   fit ← inf
|   |   m̂ ← m_i
|   |   for m ∈ mode\FP do
|   |   |   m̂[j] ← m
|   |   |   f ← fitness(∪_{k∈[1,M]} f_{ν_i}(x_k; m_1, . . . , m_{i−1}, m̂)[. . . , j],
|   |   |   ∪_{k∈[1,M]} f_{ν_i}(x_k; m_1, . . . , m_{i−1}, m̂)[. . . , j],
|   |   |   if fit > f then
|   |   |   |   fit ← f
|   |   |   |   m_i[j] ← m
|   |   |   end
|   |   end
|   end
end
```

The neural network may be a directed acyclic graph. In the per-axis selection process, the system may topologically sort the graph layer set. Foe each layer in the sorted set, and for each channel in the layer output tensor, the system may select a mode from the available modes, excluding the floating point mode, and apply the corresponding quantization to the layer output channel. Using a quantitative metric, the system may compare the layer output channel before and after applying the quantization over a set of calibration inputs. A quantitative metric may include, but is not limited to, the lp norm, Frobenius norm, other norms defined over matrices, etc. If the model layer outputs scores for categories (e.g., sigmoid layer, softmax layer), the quantitative metric might be rank or accuracy based measures. If the mode is better than the current best (according to the metric), the system sets the mode as the current best mode. Thus, the process utilizes a quantization of a previous layer. The system then registers the current best mode as the best mode for the current layer channel (any computation of this layer output channel will automatically use this mode going forward). The system then outputs the registered set of best modes, one for each layer output channel.

Figure 3:
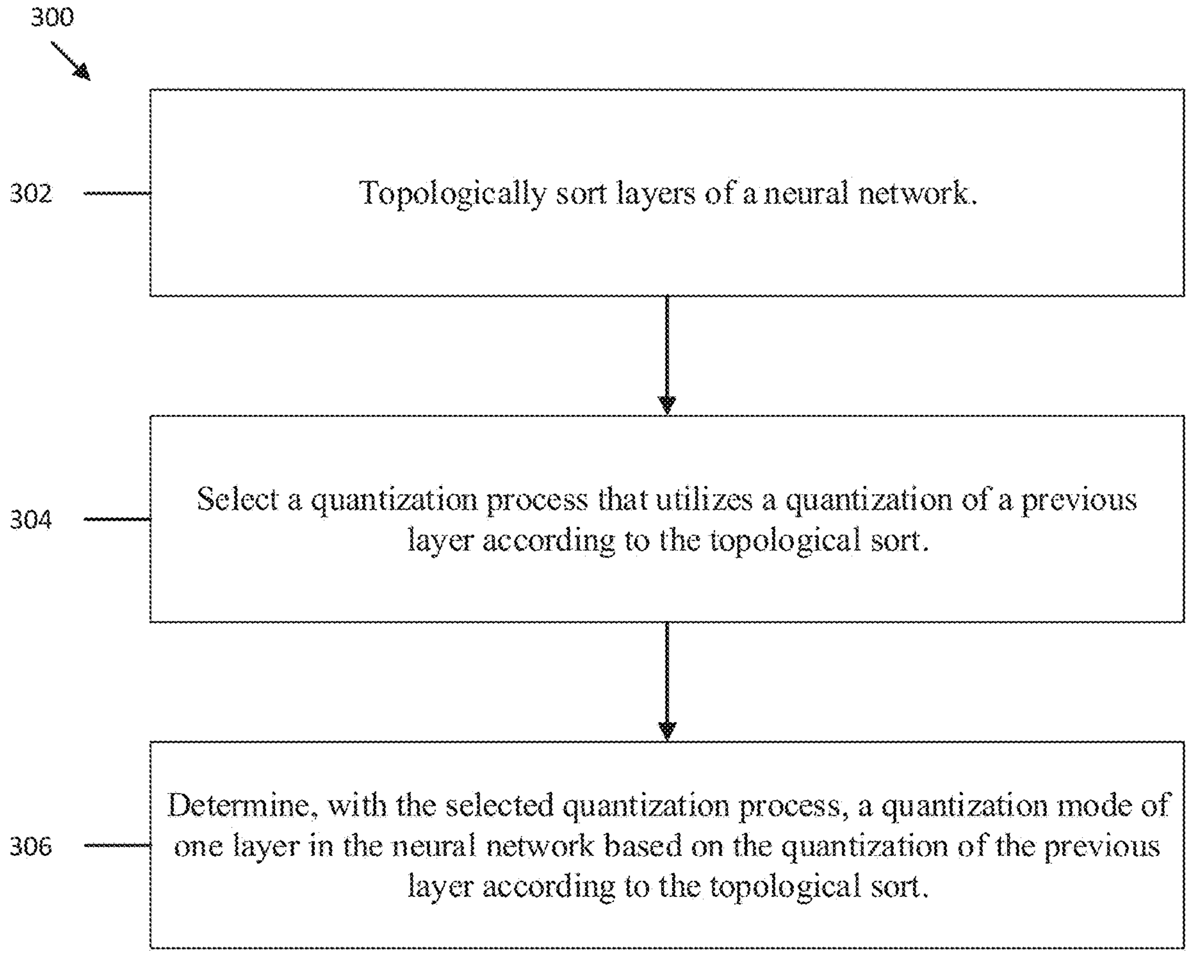
FIG. 3 illustrates a flowchart of a method of quantization, according to one embodiment.

FIG. 3 illustrates a flowchart 300 of a method of quantization, according to one embodiment. At 302, the system topologically sorts layers of a neural network. At 304, the system selects a quantization process that utilizes the quantization of previous layers according to the topological sort. The quantization process may be a per-layer mode selection process or a per-axis mode selection process. At 306, the system determines, with the selected quantization process, a quantization mode of one layer in the neural network based on the quantization of previous layers according to the topological sort.

Figure 4:
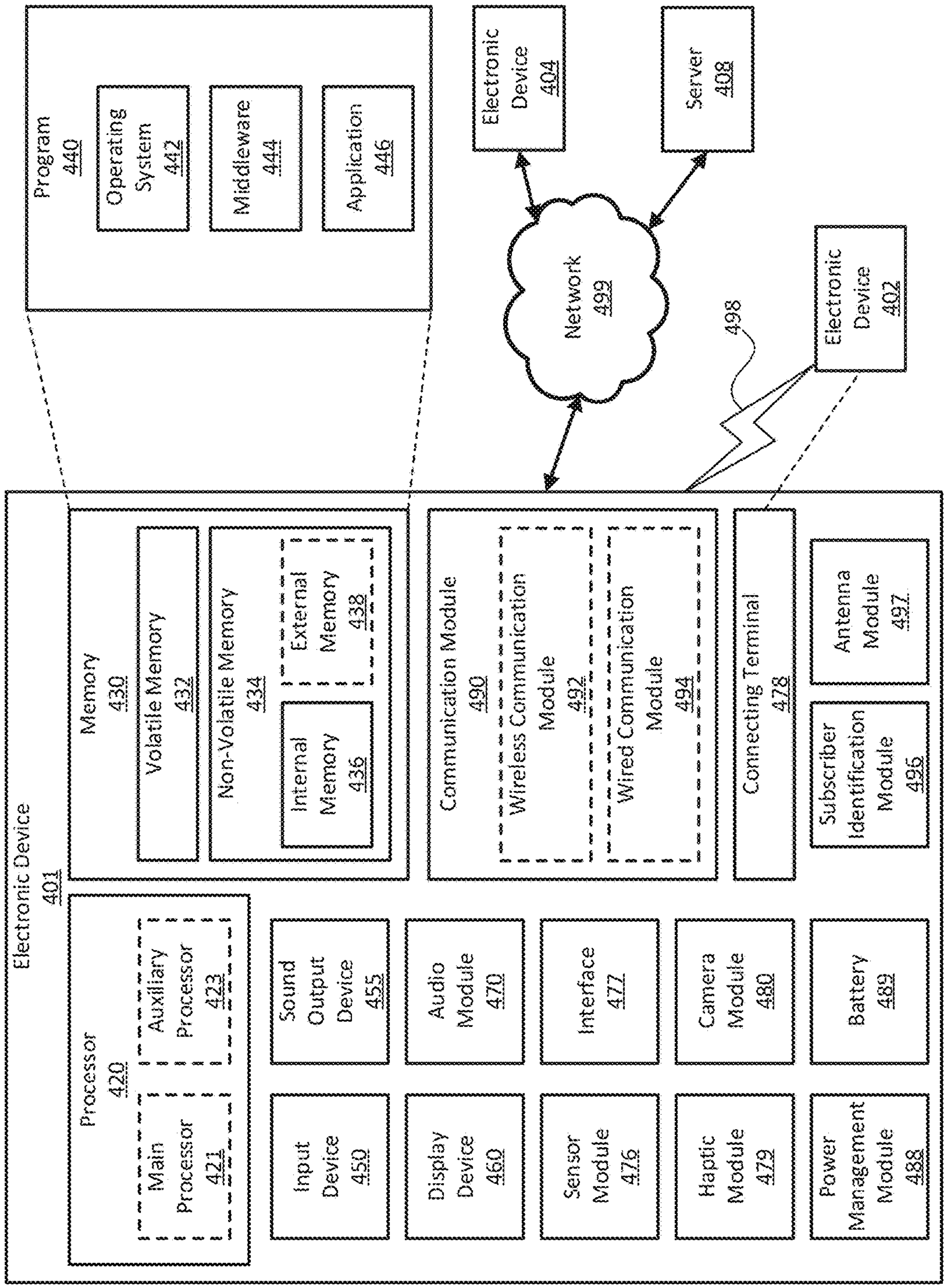
FIG. 4 illustrates a block diagram of an electronic device in a network environment, according to one embodiment.

FIG. 4 illustrates a block diagram of an electronic device 401 in a network environment 400, according to one embodiment. Referring to FIG. 4, the electronic device 401 in the network environment 400 may communicate with an electronic device 402 via a first network 498 (e.g., a short-range wireless communication network), or an electronic device 404 or a server 408 via a second network 499 (e.g., a long-range wireless communication network). The electronic device 401 may communicate with the electronic device 404 via the server 408. The electronic device 401 may include a processor 420, a memory 430, an input device 450, a sound output device 455, a display device 460, an audio module 470, a sensor module 476, an interface 477, a haptic module 479, a camera module 480, a power management module 488, a battery 489, a communication module 490, a subscriber identification module (SIM) 496, or an antenna module 497. In one embodiment, at least one (e.g., the display device 460 or the camera module 480) of the components may be omitted from the electronic device 401, or one or more other components may be added to the electronic device 401. In one embodiment, some of the components may be implemented as a single integrated circuit (IC). For example, the sensor module 476 (e.g., a fingerprint sensor, an iris sensor, or an illuminance sensor) may be embedded in the display device 460 (e.g., a display).

The processor 420 may execute, for example, software (e.g., a program 440) to control at least one other component (e.g., a hardware or a software component) of the electronic device 401 coupled with the processor 420, and may perform various data processing or computations. As at least part of the data processing or computations, the processor 420 may load a command or data received from another component (e.g., the sensor module 476 or the communication module 490) in volatile memory 432, process the command or the data stored in the volatile memory 432, and store resulting data in non-volatile memory 434. The processor 420 may include a main processor 421 (e.g., a central processing unit (CPU) or an application processor (AP)), and an auxiliary processor 423 (e.g., a graphics processing unit (GPU), an image signal processor (ISP), a sensor hub processor, or a communication processor (CP)) that is operable independently from, or in conjunction with, the main processor 421. Additionally or alternatively, the auxiliary processor 423 may be adapted to consume less power than the main processor 421, or execute a particular function. The auxiliary processor 423 may be implemented as being separate from, or a part of, the main processor 421.

The auxiliary processor 423 may control at least some of the functions or states related to at least one component (e.g., the display device 460, the sensor module 476, or the communication module 490) among the components of the electronic device 401, instead of the main processor 421 while the main processor 421 is in an inactive (e.g., sleep) state, or together with the main processor 421 while the main processor 421 is in an active state (e.g., executing an application). According to one embodiment, the auxiliary processor 423 (e.g., an image signal processor or a communication processor) may be implemented as part of another component (e.g., the camera module 480 or the communication module 490) functionally related to the auxiliary processor 423.

The memory 430 may store various data used by at least one component (e.g., the processor 420 or the sensor module 476) of the electronic device 401. The various data may include, for example, software (e.g., the program 440) and input data or output data for a command related thereto. The memory 430 may include the volatile memory 432 or the non-volatile memory 434.

The program 440 may be stored in the memory 430 as software, and may include, for example, an operating system (OS) 442, middleware 444, or an application 446.

The input device 450 may receive a command or data to be used by other component (e.g., the processor 420) of the electronic device 401, from the outside (e.g., a user) of the electronic device 401. The input device 450 may include, for example, a microphone, a mouse, or a keyboard.

The sound output device 455 may output sound signals to the outside of the electronic device 401. The sound output device 455 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 460 may visually provide information to the outside (e.g., a user) of the electronic device 401. The display device 460 may include, for example, a display, a hologram device, or a projector and control circuitry to control a corresponding one of the display, hologram device, and projector. According to one embodiment, the display device 460 may include touch circuitry adapted to detect a touch, or sensor circuitry (e.g., a pressure sensor) adapted to measure the intensity of force incurred by the touch.

The audio module 470 may convert a sound into an electrical signal and vice versa. According to one embodiment, the audio module 470 may obtain the sound via the input device 450, or output the sound via the sound output device 455 or a headphone of an external electronic device 402 directly (e.g., wired) or wirelessly coupled with the electronic device 401.

The sensor module 476 may detect an operational state (e.g., power or temperature) of the electronic device 401 or an environmental state (e.g., a state of a user) external to the electronic device 401, and then generate an electrical signal or data value corresponding to the detected state. The sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 401 to be coupled with the external electronic device 402 directly (e.g., wired) or wirelessly. According to one embodiment, the interface 477 may include, for example, a high definition multimedia interface (HDMI), a universal serial bus (USB) interface, a secure digital (SD) card interface, or an audio interface.

A connecting terminal 478 may include a connector via which the electronic device 401 may be physically connected with the external electronic device 402. According to one embodiment, the connecting terminal 478 may include, for example, an HDMI connector, a USB connector, an SD card connector, or an audio connector (e.g., a headphone connector).

The haptic module 479 may convert an electrical signal into a mechanical stimulus (e.g., a vibration or a movement) or an electrical stimulus which may be recognized by a user via tactile sensation or kinesthetic sensation. According to one embodiment, the haptic module 479 may include, for example, a motor, a piezoelectric element, or an electrical stimulator.

The camera module 480 may capture a still image or moving images. According to one embodiment, the camera module 480 may include one or more lenses, image sensors, image signal processors, or flashes.

The power management module 488 may manage power supplied to the electronic device 401. The power management module 488 may be implemented as at least part of, for example, a power management integrated circuit (PMIC).

The battery 489 may supply power to at least one component of the electronic device 401. According to one embodiment, the battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 401 and the external electronic device (e.g., the electronic device 402, the electronic device 404, or the server 408) and performing communication via the established communication channel. The communication module 490 may include one or more communication processors that are operable independently from the processor 420 (e.g., the AP) and supports a direct (e.g., wired) communication or a wireless communication. According to one embodiment, the communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A corresponding one of these communication modules may communicate with the external electronic device via the first network 498 (e.g., a short-range communication network, such as Bluetooth™, wireless-fidelity (Wi-Fi) direct, or a standard of the Infrared Data Association (IrDA)) or the second network 499 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 492 may identify and authenticate the electronic device 401 in a communication network, such as the first network 498 or the second network 499, using subscriber information (e.g., international mobile subscriber identity (IMSI)) stored in the subscriber identification module 496.

The antenna module 497 may transmit or receive a signal or power to or from the outside (e.g., the external electronic device) of the electronic device 401. According to one embodiment, the antenna module 497 may include one or more antennas, and, therefrom, at least one antenna appropriate for a communication scheme used in the communication network, such as the first network 498 or the second network 499, may be selected, for example, by the communication module 490 (e.g., the wireless communication module 492). The signal or the power may then be transmitted or received between the communication module 490 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 401 and the external electronic device 404 via the server 408 coupled with the second network 499. Each of the electronic devices 402 and 404 may be a device of a same type as, or a different type, from the electronic device 401. All or some of operations to be executed at the electronic device 401 may be executed at one or more of the external electronic devices 402, 404, or 408. For example, if the electronic device 401 should perform a function or a service automatically, or in response to a request from a user or another device, the electronic device 401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 401. The electronic device 401 may provide the outcome, with or without further processing of the outcome, as at least part of a reply to the request. To that end, a cloud computing, distributed computing, or client-server computing technology may be used, for example.

One embodiment may be implemented as software (e.g., the program 440) including one or more instructions that are stored in a storage medium (e.g., internal memory 436 or external memory 438) that is readable by a machine (e.g., the electronic device 401). For example, a processor of the electronic device 401 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method, comprising:

topologically sorting layers of a neural network;

selecting a quantization process that utilizes a quantization of a previous layer;

determining, with the selected quantization process, a first quantization mode for a first layer in the neural network, wherein the first quantization mode incurs a lowest quantization loss on first layer output among a set of available modes; and determining, with the selected quantization process, a second quantization mode for a second layer in the neural network, wherein, using quantized output from the first layer as input, the second quantization mode incurs a lowest quantization loss on second layer output among the set of available modes.

2. The method of claim 1, wherein the selected quantization process is a per-layer mode selection process.

3. The method of claim 2, wherein the quantization is applied to layer output.

4. The method of claim 3, wherein the first quantization mode is designated as a first preferred mode for the first layer, and the second quantization mode is designated as a second preferred mode for the second layer.

5. The method of claim 4, wherein the first quantization mode and the second quantization mode are selected according to a quantitative metric.

6. The method of claim 5, wherein the quantitative metric comprises at least one of an lp norm or a Frobenius norm.

7. The method of claim 1, wherein the selected quantization process is a per-axis mode selection process.

8. The method of claim 7, wherein the quantization is applied to layer output for each channel in a node output tensor.

9. The method of claim 8, wherein the first quantization mode is designated as a first preferred mode for the first layer, and the second quantization mode is designated as a second preferred mode for the second layer.

10. The method of claim 1, wherein the neural network is a directed acyclic graph network.

11. A system, comprising:

a memory; and a processor configured to:

topologically sort layers of a neural network;

select a quantization process that utilizes a quantization of a previous layer;

determine, with the selected quantization process, a first quantization mode for a first layer in the neural network, wherein the first quantization mode incurs a lowest quantization loss on first layer output among a set of available modes; and determine, with the selected quantization process, a second quantization mode for a second layer in the neural network, wherein, using quantized output form the first layer as input, the second quantization mode incurs a lowest quantization loss on second layer output among the set of available modes.

12. The system of claim 11, wherein the selected quantization process is a per-layer mode selection process.

13. The system of claim 12, wherein quantization is applied to layer output.

14. The system of claim 13, wherein the first quantization mode is designated as a first preferred mode for the first layer, and the second quantization mode is designated as a second preferred mode for the second layer.

15. The system of claim 14, wherein the first quantization mode and the second quantization mode are selected according to a quantitative metric.

16. The system of claim 15, wherein the quantitative metric comprises at least one of an lp norm or a Frobenius norm.

17. The system of claim 11, wherein the selected quantization process is a per-axis mode selection process.

18. The system of claim 17, wherein the quantization is applied to layer output for each channel in a node output tensor.

19. The system of claim 18, wherein the first quantization mode is designated as a first preferred mode for the first layer, and the second quantization mode is designated as a second preferred mode for the second layer.

20. The system of claim 11, wherein the neural network is a directed acyclic graph network.

* * * * *